(12) United States Patent
Matteucci

(10) Patent No.: US 8,388,416 B2
(45) Date of Patent: Mar. 5, 2013

(54) METHOD FOR THE MANUFACTURE OF REINFORCED DIAMOND-COATED CABLES AND CABLE OBTAINED USING SUCH METHOD

(76) Inventor: Francesco Matteucci, Genoa (IT)

(*) Notice: Subject to any disclaimer, the term of this patent is extended or adjusted under 35 U.S.C. 154(b) by 288 days.

(21) Appl. No.: 12/993,321

(22) PCT Filed: May 28, 2009

(86) PCT No.: PCT/EP2009/056573
§ 371 (c)(1),
(2), (4) Date: Jan. 7, 2011

(87) PCT Pub. No.: WO2009/147074
PCT Pub. Date: Dec. 10, 2009

(65) Prior Publication Data
US 2011/0094490 A1 Apr. 28, 2011

(30) Foreign Application Priority Data
Jun. 4, 2008 (IT) .............................. GE2008A0051

(51) Int. Cl.
*B28D 1/08* (2006.01)
(52) U.S. Cl. .......................................... 451/296; 125/22
(58) Field of Classification Search .................. 451/296, 451/36, 355; 125/16.02, 21, 22
See application file for complete search history.

(56) References Cited

U.S. PATENT DOCUMENTS

| | | | | |
|---|---|---|---|---|
| 4,674,474 A | * | 6/1987 | Baril | ................................ 125/21 |
| 4,856,490 A | * | 8/1989 | Kawase et al. | ................... 125/21 |
| 6,131,558 A | | 10/2000 | Weber | |

FOREIGN PATENT DOCUMENTS

| | | |
|---|---|---|
| DE | 201 422 | 9/1908 |
| DE | 210 270 | 5/2009 |
| EP | 0 778 102 | 6/1997 |

(Continued)

OTHER PUBLICATIONS

International Search Report for PCT/EP2009/056573.

(Continued)

*Primary Examiner* — Robert Rose
(74) *Attorney, Agent, or Firm* — Stites & Harbison PLLC; Marvin Petry

(57) ABSTRACT

The method relates to the manufacture of a reinforced diamond-coated cable for cutting structures and materials of steel, concrete, steel and concrete, stone materials or the like, in which such diamond-coated cable comprises a plurality of outer strands (101) of metal material such as steel or the like wound in a helix around an inner central strand (201) and a series of sheaths (2) inserted along such outer strands (101) and having on their external profiles (202) projecting members of strongly abrasive materials such as industrial diamonds or the like. The method comprises the following stages: a) at least partly unwinding the outer strands (101) between each pair of successive sheaths (2', 2") so as to space them apart to create a free space (3, 3') between the outer strands (101) and the central strand (201), b) inserting a rigid mechanical interference member (4, 6) in the space between one outer strand and the other and in the said free space (3, 3') to create an enlarged zone of suitable diameter (D) between each pair (2', 2") of successive sheaths, c) again helically winding the outer strands (101) around such rigid mechanical interference member (4, 6).

9 Claims, 6 Drawing Sheets

FOREIGN PATENT DOCUMENTS

Figure 4:
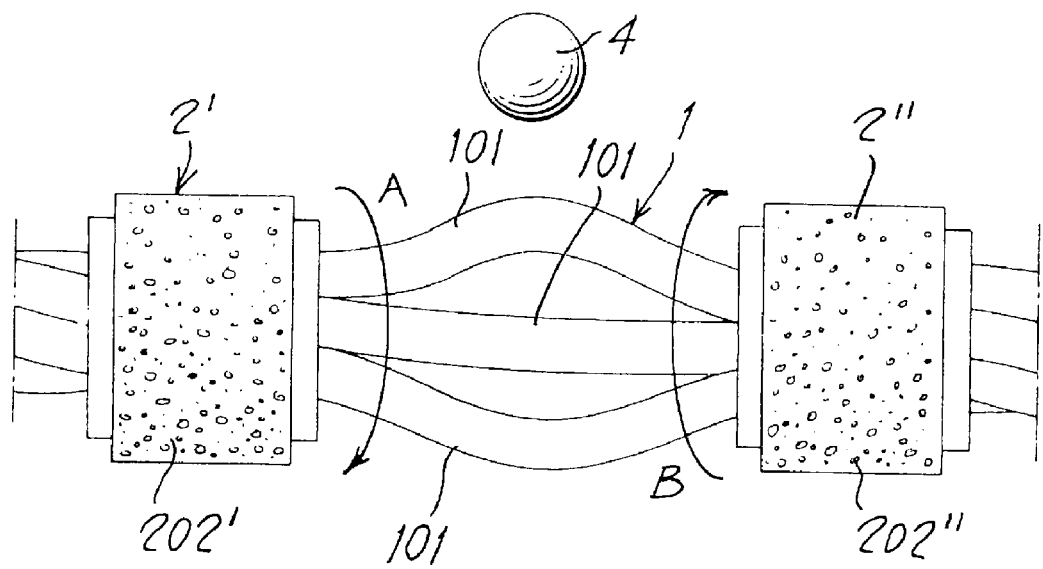

| | | |
|---|---|---|
| FR | 364 924 | 8/1906 |
| FR | 2 513 558 | 4/1983 |
| IT | 1 166 143 | 4/1987 |
| IT | 1 166 145 | 4/1987 |
| JP | 09 225806 | 9/1997 |

OTHER PUBLICATIONS

Written Opinion of International Searching Authority for PCT/EP2009/056573.

* cited by examiner

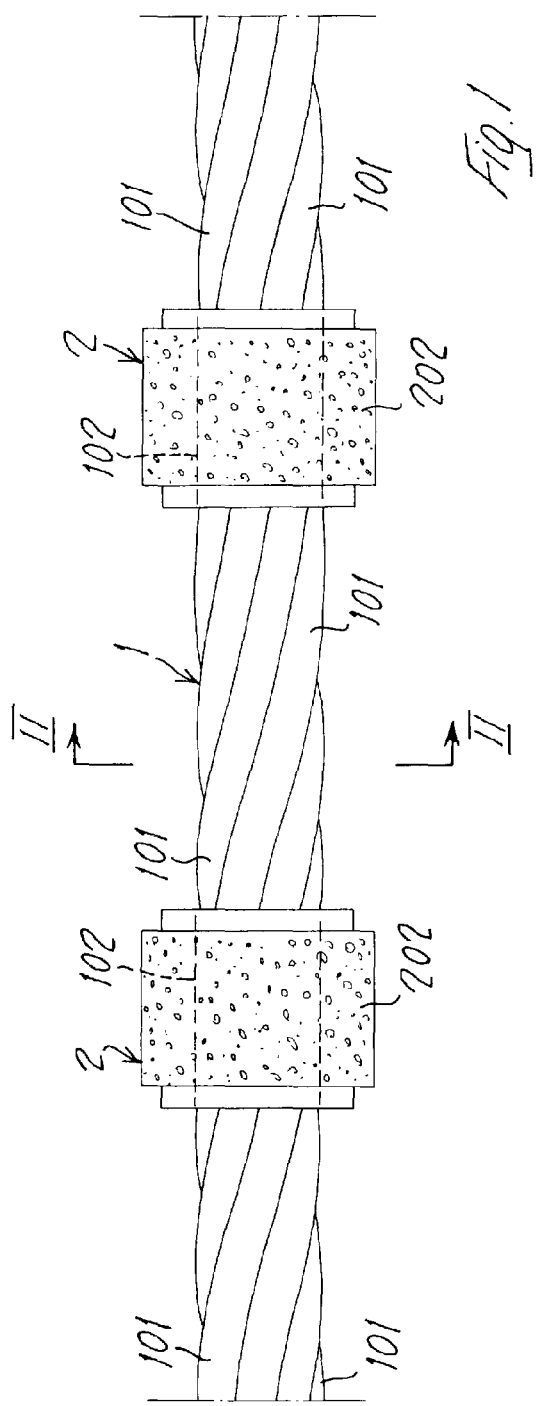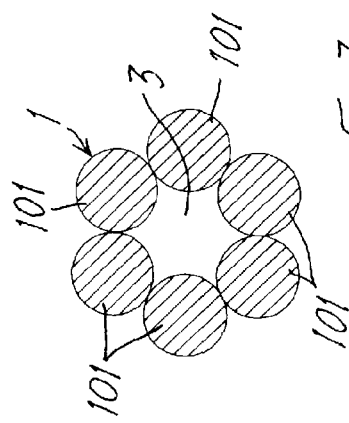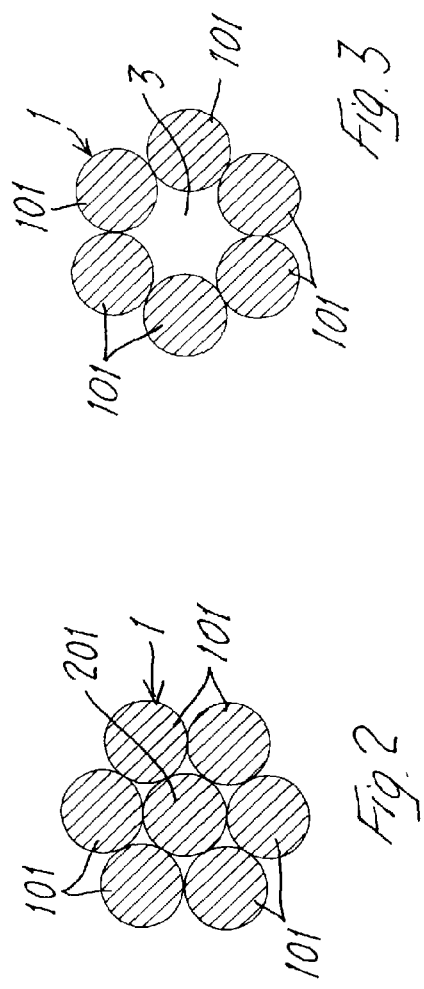

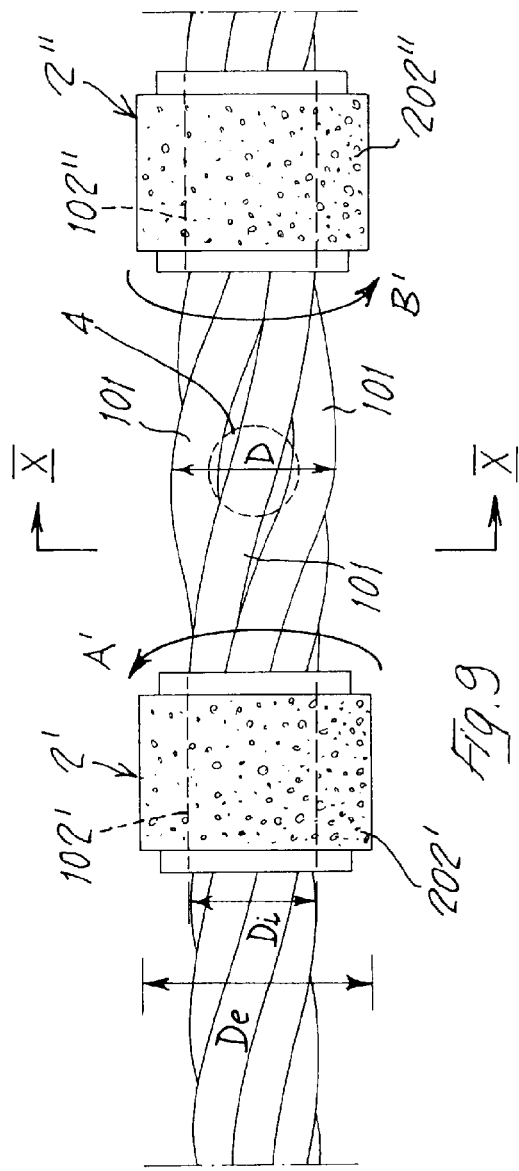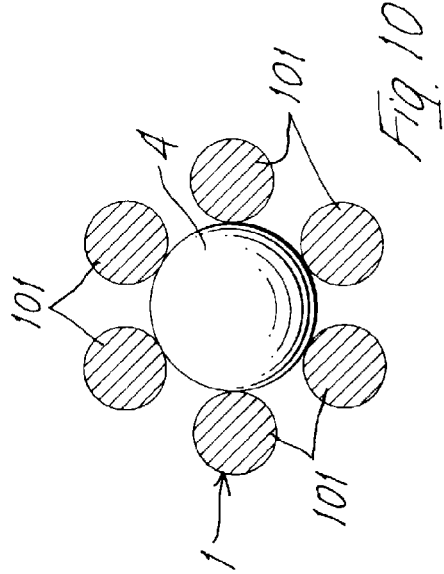

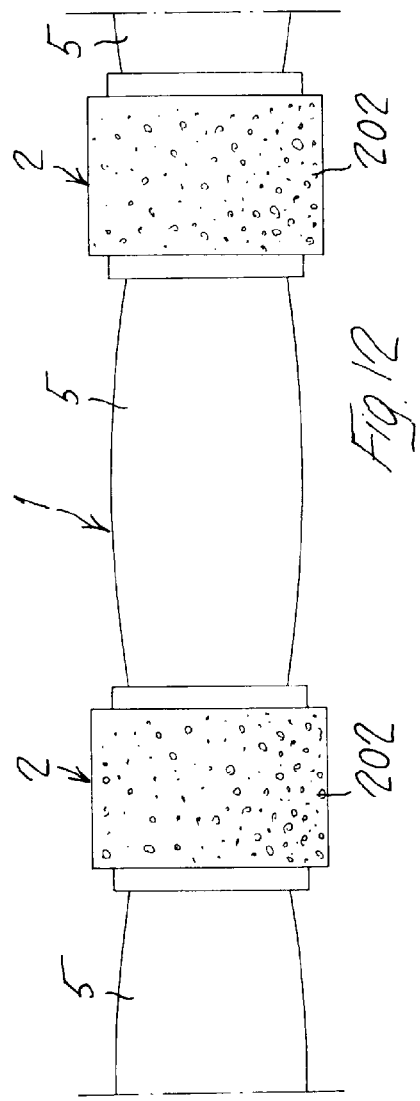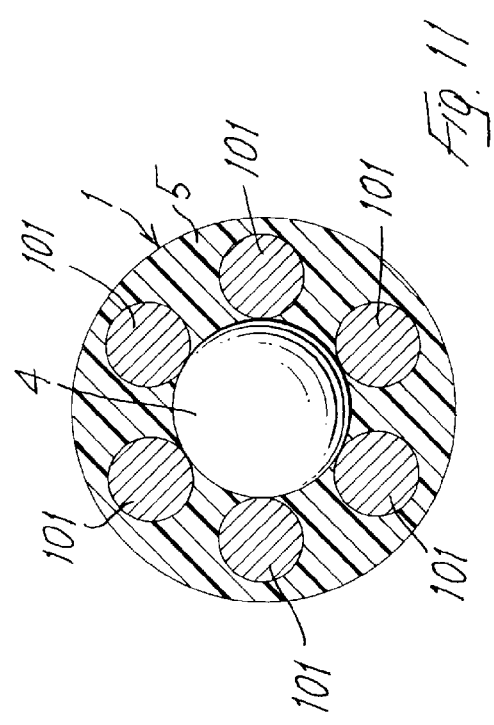

METHOD FOR THE MANUFACTURE OF REINFORCED DIAMOND-COATED CABLES AND CABLE OBTAINED USING SUCH METHOD

This invention relates to a method for the manufacture of reinforced diamond-coated cables for cutting structures and materials of steel, concrete, steel and concrete, stone materials or the like and a diamond-coated cable obtained by such method.

As is known in the field of cutting structures of the type indicated above, including underwater structures, cutting machines on which preferably steel cables formed from a series of outer strands preferably wound in a helix around an inner central strand are used. Along such cables a series of sheaths provided with projecting members based on strongly abrasive materials, such as industrial diamonds or the like, are inserted on the outer surface of such strands. These sheaths are generally equally spaced and spacing springs located between one sheath and the next and covered with protective resilient material may be provided around the outer surface of the steel cable. These diamond-coated cables have to be formed into a closed ring and suitably fitted on the cutting machine which uses them.

The behaviour of such conventional diamond-coated cables during cutting is directly associated with a number of parameters such as the resistance of the strands to tearing, the ability of the sheaths to remain anchored in their original positions when subjected to axial tensile forces, the nature of the uniformity of the profile formed by the working surface of the diamond-coated cable, the characteristics and dimensions of the industrial diamond inserts used, and the shape and type of material of the object being cut.

One of the main disadvantages of the diamond-coated cables described above is that the resistance of the strands to tearing may be as much as five times greater than the ability of the individual sheaths to remain anchored in their original position when the latter are subjected to axial tensile forces. The limit of such conventional cables is represented by the limiting stresses which can be supported by these sheaths. It can in fact happen that given the high stresses to which diamond-coated cable is subjected during cutting operations the sheaths move along the outer surface of the outer strands and form groups of sheaths twisted against each other. This bunching and twisting of the sheaths in fact causes the diamond-coated cable to stop running and may also cause it to break.

The main object of this invention is therefore a method for the manufacture of reinforced diamond-coated cables for cutting structures and materials of steel, concrete, steel and concrete, stone materials or the like which makes it possible to obtain a very much stronger diamond-coated cable that is less vulnerable than conventional diamond-coated cables and which also has a greater degree of friction on the material being cut.

This object is accomplished by this invention by means of a method of manufacturing a reinforced diamond-coated cable for cutting structures and materials of steel, concrete, steel and concrete, stone materials or the like in which the diamond-coated cable comprises a plurality of outer strands preferably of metal material such as steel or the like wound in a helix around a central inner strand and a series of sheaths inserted along such outer strands and bearing projecting members of strongly abrasive materials such as industrial diamonds or the like on their outer profile, characterised by the following stages:

a) at least partly unwinding the outer strands between each pair of successive sheaths so as to space them apart to create a free space between the outer strands and the central strand, b) inserting a rigid mechanical interference member in the space between one outer strand and the other and in the said free space so as to create an enlarged zone of suitable diameter between each pair of successive sheaths, c) again helically winding the outer strands around such rigid mechanical interference member.

A further object of this invention is a reinforced diamond-coated cable comprising a plurality of outer strands of metal material such as steel or the like wound in a helix around an inner central strand and a series of sheaths inserted along such outer strands and bearing projecting members of strongly abrasive materials such as industrial diamonds or the like on their outer profile characterised in that such outer strands comprise an enlarged zone within which at least one rigid mechanical interference member is positioned between each pair of successive sheaths in such a series of sheaths; the outer diameter of such an enlarged zone increasing with distance from such sheaths towards the interior of such enlarged zone in such a way that such external diameter of such an enlarged zone is substantially greater than the internal diameter of the sheaths close to the same.

Figure 5:
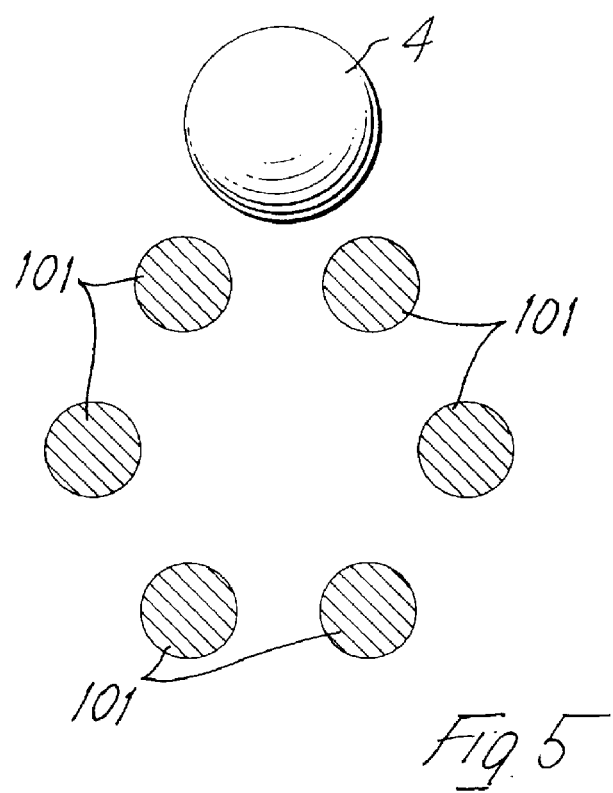
Figure 8:
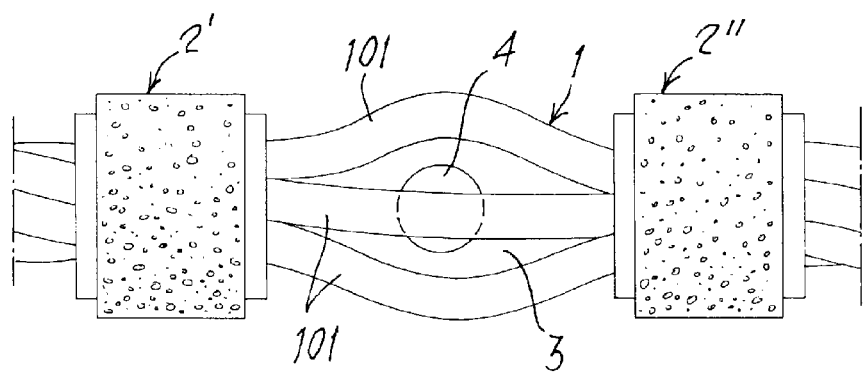
Figure 6:
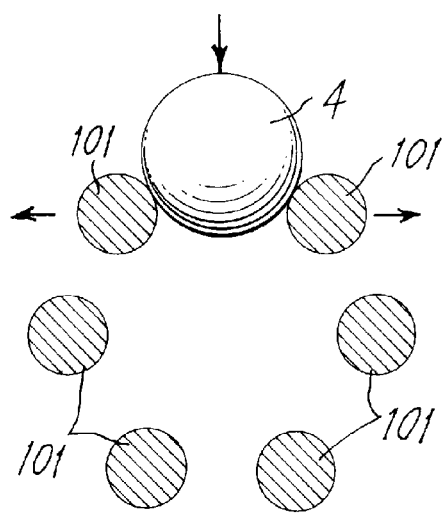
Figure 7:
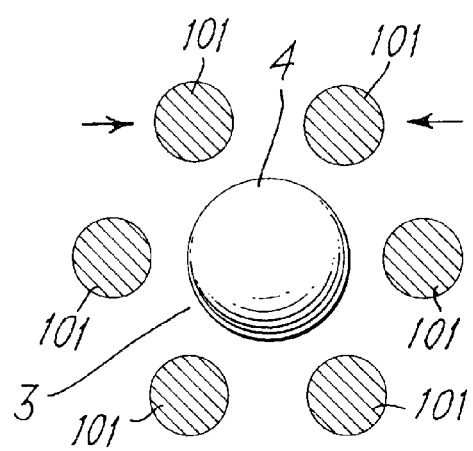
Figure 13:
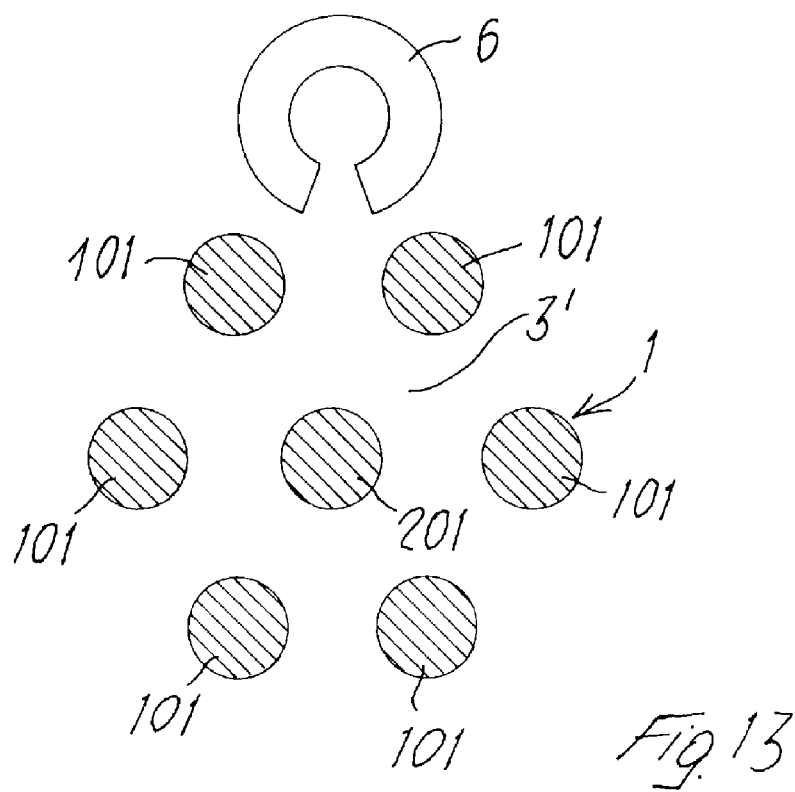
Figure 14:
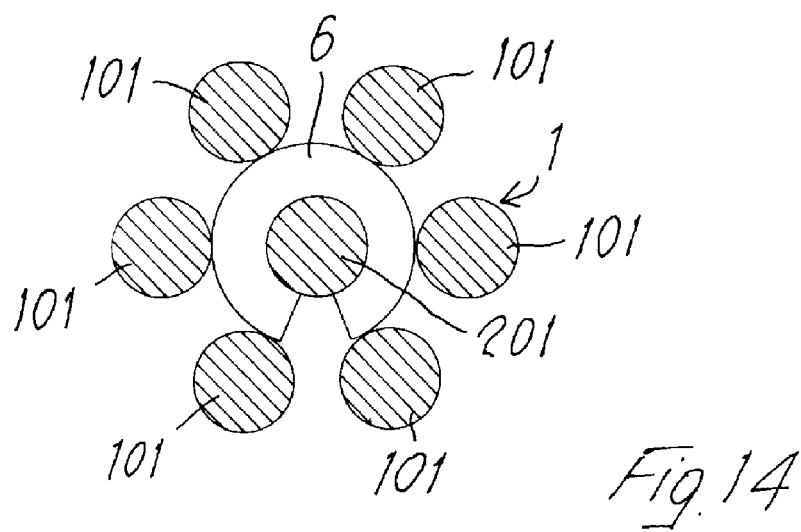

Further features and advantages of this invention will be better understood in the course of the following description, provided by way of example and without limitation and with reference to the appended drawings, in which:

FIG. 1 illustrates a partial view in lateral elevation of a conventional diamond-coated cable comprising a series of outer strands wound in a helix and comprising projecting inserts made of industrial diamonds or the like on the outer surface of the sheaths, FIG. 2 illustrates a view in transverse cross-section along the line II-II of the diamond-coated cable in FIG. 1, comprising a central strand around which a series of outer strands are wound in a helix, FIG. 3 illustrates further cross-sectional view of the diamond-coated cable in FIGS. 1 and 2 from which the central strand has been removed, FIG. 4 illustrates a partial view in lateral elevation of the diamond-coated cable in FIG. 1 in which the outer strands in a section between one sheath and the next have been unwound and spaced apart from each other so as to insert a rigid mechanical interference member between them, FIG. 5 illustrates a first view in transverse cross-section of the diamond-coated cable in FIG. 4, FIG. 6 illustrates a second view in transverse cross-section of the diamond-coated cable in FIG. 4, in which the mechanical interference member is ready for insertion into the diamond-coated cable, FIG. 7 illustrates a third view in transverse cross-section of the diamond-coated cable in FIG. 4, in which the mechanical interference member has been fully inserted within such diamond-coated cable, FIG. 8 illustrates a further view in lateral elevation of the diamond-coated cable in the preceding figures comprising a mechanical interference member within, FIG. 9 illustrates a partial view in lateral elevation of a reinforced diamond-coated cable according to this invention, FIG. 10 illustrates a view in transverse cross-section along the line X-X of the present reinforced diamond-coated cable in FIG. 9, FIG. 11 illustrates a further view in transverse cross-section of the present reinforced diamond-coated cable in which a layer of elastomer material such as rubber or the like has been applied between one sheath and the next, FIG. 12 illustrates another partial view in lateral elevation of the present reinforced diamond-coated cable, FIG. 13 illustrates a view in transverse cross-section of the present diamond-coated cable in which the strands are unwound and spaced apart from each other and the mechanical interference member is a cloven ring, and FIG. 14 illustrates another view in transverse cross-section of the cable in FIG. 13 in which the mechanical interference ring straddles and closely surrounds the central strand.

With reference to these appended drawings and with particular reference to FIG. 1 thereof, 1 indicates a steel cable formed of a series of outer strands 101 wound in a helix about a central inner strand 201. In this case, by way of example, six strands 101 are provided, as may be seen in the transverse cross-section in FIG. 1, wound in a helix around such inner central strand 201. Along such steel cable 1 formed of outer strands 101 and inner strand 201 are located sheaths 2 which have an inner hole 102 through which they can be fitted around the outer surface of outer strands 101. These sheaths 2, of substantially cylindrical shape, which are closed or open and closable, comprise an external profile 202 on which the projecting inserts made on the basis of strongly abrasive materials such as industrial diamonds or the like are positioned.

According to this method, it is first of all necessary to create a free space 3 or 3' (see FIGS. 3 and 13) within steel cable 1 in such a way that at least one rigid mechanical interference member 4 can be inserted, see FIG. 4 or FIG. 13, in which such outer strands 101 are therefore suitably moved apart from each other. This operation of moving the strands apart from each other is performed by fitting two successive sheaths 2' and 2" and rotating steel cable 1 in opposite directions A and B in such a way that such outer strands 101, which as mentioned are wound in a helix, are loosened and adopt a widened configuration as is also clearly shown in FIGS. 5 and 13. If the mechanical interference member is of some thickness, for example is of spheroidal shape, and inner central strand 201 is of metal material or in any event of rigid material, this free space between the strands is created by removing central inner strand 201, compare FIGS. 2 and 3 in the appended drawings, and obtaining a longitudinal cavity 3. Preferably this operation is carried out before outer strands 101 are wound. If on the other hand central inner strand 201 is made of an easily deformable material, for example of several strands of fabric woven together, or the mechanical interference member is of a suitable shape and size, for example a ring as in FIG. 13, this central strand 201 may also be left within steel cable 1.

According to a subsequent stage in this method, see FIG. 4 in the appended drawings, such a rigid mechanical interference member, which may for example be a spheroidal member 4 (as in the figure), or cylindrical, ovoidal or in the form of a ring, which will be described below, or of other shape, and is made of metal material, such as iron, lead, tin or other metal material, or of plastics material, is inserted within outer strands 101 between each pair of successive sheaths on the diamond-coated cable, for example sheaths 2' and 2". This interface member may comprise one or two elements, which may also be of matching shape, inserted into the free space between the outer strands, adjusting to the central inner strand.

In order to insert such mechanical interference member within the cable, see for example spheroidal mechanical interference member 4 in FIG. 6, a pressure is applied to the latter to enlarge the space created between one outer strand and the next until element 4 is fully inserted in longitudinal cavity 3 created within steel cable 1, see FIG. 7. The diamond-coated cable then takes the form as seen in lateral elevation in FIG. 8, with the outer strands compressed between sheaths 2' and 2" which are still in an encircling configuration.

As an alternative, in the case where such mechanical interference member 4 is for example made of metal material having a low melting point or hard elastomer material, it may be inserted by intrusive pumping of the material constituting such member 4 between the outer strands so as to bring about enlargement of the outer profile of steel cable 1 between one sheath and the next when the process has been completed.

Once such mechanical interference member 4 has been inserted, strands 101 are wound in a helix and become repositioned in the original configuration. This operation is performed by again surrounding cable 1 at successive sheaths 2' and 2" and contrarotating such cable in two directions A' and B' opposite to directions A and B illustrated in FIG. 4 in such a way that such outer strands 101 are wound in a helix and are tightened together around mechanical interference member 4, as may clearly be seen in the transverse cross-section in FIG. 10. This interference member 4 thus generates a zone of enlargement of steel cable 1 between each pair of successive sheaths 2' and 2" of the diamond-coated cable. The outer diameter D of this enlarged zone increases with distance from sheaths 2' and 2" and even close to the same is advantageously greater than the internal diameter Di of internal holes 102' and 102" in sheaths 2' and 2". The maximum diameter of this enlarged zone is also less than the external diameter De of bundles 202' and 202" bearing the projecting inserts of industrial diamonds.

As mentioned previously, FIG. 13 shows a rigid mechanical interference member comprising a cloven ring 6. Once outer strands 101 have been moved away from inner central strand 210 and free space 3' has been created, this cloven ring 6 is inserted between two successive outer strands in a way similar to that illustrated for the spheroidal mechanical interference member illustrated in FIG. 6. This cloven ring may be capable of deforming resiliently so as to open and straddle inner central strand 201 and when placed in position return resiliently to its original configuration, or clamp itself around inner central strand 201, as illustrated in FIG. 14. Once cloven ring 6 has straddled and clamped around inner central strand 201 outer strands 101 are wound helically in a wholly similar way to that described previously.

At this point the diamond-coated cable is coated between each pair of sheaths 2 with one or more layers 5 of elastomer material, such as rubber or other material, or plastics material. This elastomer or plastics material fills the residual spaces left between one outer strand and another following the insertion of interference member 4 and covers such outer strands 101, as will be clearly seen in FIGS. 11 and 12.

This diamond-coated cable can therefore be used in any machine for cutting structures, including underwater structures, of steel, concrete, steel and concrete, stone materials or the like and through inserting a mechanical interference member between each pair of sheaths on the cable a zone of enlargement of the cable is created between each pair of successive sheaths 2 so that while the cutting machine is in operation giving rise to strong axial stresses on the diamond-coated cable the strength of the same is appreciably increased. This enlarged zone, which has an external diameter D which increases with distance from the sheaths and is already greater than the internal diameter Di of holes 102' and 102" therein close to the latter, prevents the sheaths from making axial movements along such cable, thus overcoming the disadvantages of damage and breakage in known diamond-coated cables.

The invention claimed is:

1. Method for the manufacture of a reinforced diamond-coated cable for cutting structures and materials of steel, concrete, steel and concrete, stone materials or the like, in which the said diamond-coated cable comprises a plurality of outer strands (101) preferably of metal material such as steel or the like wound in a helix around a possible inner central strand (201) and a series of sheaths (2) inserted along the said outer strands (101) bearing projecting members of strongly abrasive material such as industrial diamonds or the like on the outer profile (202), characterised by the following stages:
   a) at least partly unwinding the outer strands (101) between each pair of successive sheaths (2' 2") so as to space them apart to create a free space (3, 3') between the outer strands (101) and the central strand (201),
   b) inserting a rigid mechanical interference member (4, 6) in the space between one outer strand and the other and in the said free space (3, 3') to create an enlarged zone of suitable diameter (D) between each pair (2', 2") of successive sheaths,
   c) again helically winding the outer strands (101) around such rigid mechanical interference member (4, 6).

2. Method according to claim 1, characterised in that if the inner central strand (201) is made of metal material or hard plastics material, and when the thickness and dimensions of the rigid mechanical interference member (4) require it, it comprises a stage, preceding said stage a), of removing the said inner central strand (201) and creating a longitudinal cavity (3).

3. Method according to claim 1, characterised in that if the said rigid mechanical interference member (4) is made of a metal having a low melting point, hard elastomer materials, polymers or the like, the said stage b) is carried out by intrusive pumping of the said rigid mechanical interference member (4) between the outer strands (101).

4. Method according to claim 1, characterised in that the said stage a) is carried out by fitting two successive sheaths (2', 2") and rotating the said outer strands (101) in two opposite directions (A, B) to unwind them from their initial configuration in which they are wound in a helix.

5. Method according to claim 4, characterised in that the said stage c) is carried out by fitting the said pair of successive sheaths (2', 2") and contrarotating the said outer strands (101) in two directions (A', B') opposite to the said winding directions (A, B) so that the outer strands (101) are again wound into a helix and tightened together and around the mechanical interference member (4).

6. Method according to claim 1, characterised in that after said stage c) there is a further stage of rubber coating or coating the outer strands (101) with plastics material in the enlarged zone formed between two successive sheaths (2' 2"), which by penetrating the spaces present between the outer strands and the mechanical interference member improves the compactness of the cable.

7. Reinforced diamond-coated cable comprising a plurality of outer strands (101) of metal material such as steel or the like wound in a helix around an inner central strand (201) and a series of sheaths (2) inserted along the said outer strands and bearing on their outer profile (202) projecting members of strongly abrasive materials such as industrial diamonds or the like, characterised in that between each pair of successive sheaths (2', 2") in the said series of sheaths the said outer strands (101) comprise an enlarged zone within which there is positioned at least one rigid mechanical interference member, the external diameter (D) of the said enlarged zone increasing the distance from the said sheaths (2', 2") towards the interior of the said enlarged zone so that the said external diameter (D) of the said enlarged zone is substantially greater than the internal diameter (Di) of the sheaths (2', 2") even close to them.

8. Diamond-coated cable according to claim 7, characterised in that the said mechanical interference member (4) comprises at least one spheroidal, cylindrical, ovoidal or ring-shaped member (6) or other shaped member made of metal, hard plastics or similar material.

9. Diamond-coated cable according to claim 7, characterised in that it comprises at least one protective layer (5) of elastomer material between one sheath and the next in each pair of successive sheaths (2), the said layer (5) being capable of filling the spaces left between one outer strand (101) and the next following insertion of the said rigid mechanical interference member (4).

* * * * *